(12) United States Patent
Migault et al.

(10) Patent No.: US 12,301,545 B2
(45) Date of Patent: May 13, 2025

(54) IPsec PRIVACY PROTECTION

(71) Applicants: Daniel Migault, Montreal (CA); Stere Preda, Longueuil (CA); Amine Boukhtouta, Laval (CA); Fereydoun Farrahi Moghaddam, Brossard (CA)

(72) Inventors: Daniel Migault, Montreal (CA); Stere Preda, Longueuil (CA); Amine Boukhtouta, Laval (CA); Fereydoun Farrahi Moghaddam, Brossard (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 219 days.

(21) Appl. No.: 17/796,120

(22) PCT Filed: Jan. 30, 2020

(86) PCT No.: PCT/IB2020/050763
§ 371 (c)(1),
(2) Date: Jul. 28, 2022

(87) PCT Pub. No.: WO2021/152349
PCT Pub. Date: Aug. 5, 2021

(65) Prior Publication Data
US 2023/0094458 A1 Mar. 30, 2023

(51) Int. Cl.
*H04L 9/40* (2022.01)
(52) U.S. Cl.
CPC ...... *H04L 63/0414* (2013.01); *H04L 63/0428* (2013.01); *H04L 63/166* (2013.01)

(58) Field of Classification Search
CPC .................................................. H04L 63/0428
See application file for complete search history.

(56) References Cited

U.S. PATENT DOCUMENTS

| | | | |
|---|---|---|---|
| 7,017,042 B1 | 3/2006 | Ziai | |
| 7,181,612 B1 | 2/2007 | Pellacuru | |
| 7,676,814 B2 | 3/2010 | Karighattam | |
| 7,895,648 B1 | 2/2011 | Nandy et al. | |
| 2005/0198691 A1* | 9/2005 | Xiang | H04W 12/033 726/3 |
| 2012/0072513 A1* | 3/2012 | Zhang | H04L 61/5076 709/206 |

(Continued)

FOREIGN PATENT DOCUMENTS

| | | |
|---|---|---|
| EP | 0982909 A2 | 3/2000 |
| WO | 2015005839 A1 | 1/2015 |
| WO | 2018234849 A1 | 12/2018 |

OTHER PUBLICATIONS

Altaf Shaik et al., Practical Attacks Against Privacy and Availability in 4G/LTE Mobile Communication Systems, arXiv:1510.07563v3 [cs.CR], Aug. 7, 2017, 16 pages.

(Continued)

*Primary Examiner* — Viet D Vu
(74) *Attorney, Agent, or Firm* — Ericsson Canada Inc.; David J. Rahmer

(57) ABSTRACT

Systems and methods for maintaining privacy of security protocol parameters are provided. A node receives an encrypted packet and determines if the Security Parameters Index (SPI) value has been updated. The node can modify its stored SPI value(s) accordingly and process the encrypted packet.

14 Claims, 9 Drawing Sheets

(56) References Cited

U.S. PATENT DOCUMENTS

2019/0166109 A1    5/2019  Wang et al.
2019/0190710 A1*   6/2019  Chopra ............... G06F 9/45558

OTHER PUBLICATIONS

P. Jokela et al., Using the Encapsulating Security Payload (ESP) Transport Format with the Host Identity Protocol (HIP), RFC 5202, Apr. 2008, 30 pages.
ISR and Written Opinion dated Oct. 26, 2020 from corresponding application PCT/IB2020/050763.

* cited by examiner

IPsec PRIVACY PROTECTION

TECHNICAL FIELD

The present disclosure generally relates to communication networks and security in such networks.

BACKGROUND

Security mechanisms such as Internet Protocol Security (IPsec) can be used to secure communications between two trusted entities over an untrusted network. IPsec is a network protocol suite that has been standardized by the Internet Engineering Task Force (IETF) for authenticating and encrypting data packets transmitted over a network.

IPsec is a suite of protocols for protecting communications, including protocols for encrypting and authenticating the communication and negotiating cryptographic keys for use during the session. IPsec can be used to protect data flows between security endpoints such as a pair of hosts (host-to-host), a pair of security gateways (network-to-network), or a security gateway and a host (network-to-host) by using cryptographic security services over IP networks. IPsec can support network-level peer authentication, data-origin authentication, data integrity, data confidentiality (e.g. encryption), and replay protection.

A data flow can typically be identified by the 5-tuple of values comprising its TCP/IP connection (source IP address, source port number, destination IP address, destination port number, protocol). In a conventional IPsec deployment, a data flow is associated with a Security Association (SA) which can contain the cryptographic material (e.g. the encryption/decryption keys) necessary for processing packet traffic. Protected traffic can be uniquely identified by its Security Parameter Index (SPI). This index can be used by a receiving entity to identify the corresponding SA to access the protected information.

As such, each data flow requires a distinct SA such that it can be identified by the corresponding SPI parameter. Typically, when an IPsec session is established by a mobile device or IoT equipment, etc., SPI can be used to mark its presence. As such, IPsec is a security asset, which can corroborate privacy of sensitive data communications and a protection against reconnaissance attacks. However, the SPI can also potentially be used to track a session, and thus can be considered a potential vulnerability.

SPI value(s) are typically created at the creation of the SA, that is when the cryptographic parameters, traffic selectors as well as other necessary parameters are agreed upon. This exchange is referred to as CREATE_CHILD_SA exchange. The SPI is expected to remain until the SA is deleted.

If an update of the SPI is needed, conventionally it is handled by the control plane and could be performed by an IKEv2 mechanism. However, the control plane traffic can potentially be observed by a passive attacker. In the case of the SPI being updated via IKEv2, a passive attacker could observe that: 1) a control plane operation occurred, 2) the former observed value of the SPI is no longer used, and 3) a new SPI value is being used. As a result, such traffic could raise awareness that a SPI will be updated.

SUMMARY

It is an object of the present disclosure to obviate or mitigate at least one disadvantage of the prior art.

In a first aspect of the present disclosure, there is provided a method performed by a receiving node. The receiving node can comprise a communication interface and processing circuitry. The receiving node receives an encrypted packet from a transmitting node, the packet including a Security Parameters Index (SPI) value. The receiving node identifies a Security Association (SA) associated with the packet in accordance with determining that the SPI value of the packet corresponds to one of a plurality of stored SPI values associated with the SA. Responsive to determining that the SPI value of the packet has been updated by the transmitting node, the receiving node modifies the plurality of stored SPI values associated with the SA. The packet can be decrypted using a security key from the identified SA.

In some embodiments, the plurality of stored SPI values associated with the SA can include at least a current SPI value and a next SPI value. In some embodiments, the plurality of stored SPI values associated with the SA can further includes one or more previous SPI value(s).

In some embodiments, determining that the SPI value of the packet has been updated by the transmitting node can comprise, determining that the SPI value of the packet matches a next SPI value associated with the SA.

In some embodiments, modifying the plurality of stored SPI values associated with the SA can comprise at least one of the following: copying the stored next SPI value to a current SPI field; generating a next SPI value; storing the generated next SPI value in a next SPI field; and/or copying a stored current SPI value to a previous SPI field. In some embodiments the next SPI value can be generated using a SPI algorithm.

In some embodiments, determining that the SPI value of the packet corresponds to one of a plurality of stored SPI values associated with the SA comprises, determining if the SPI value of the packet matches a value stored in one of a previous SPI field, a current SPI field, and/or a next SPI field associated with the SA.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
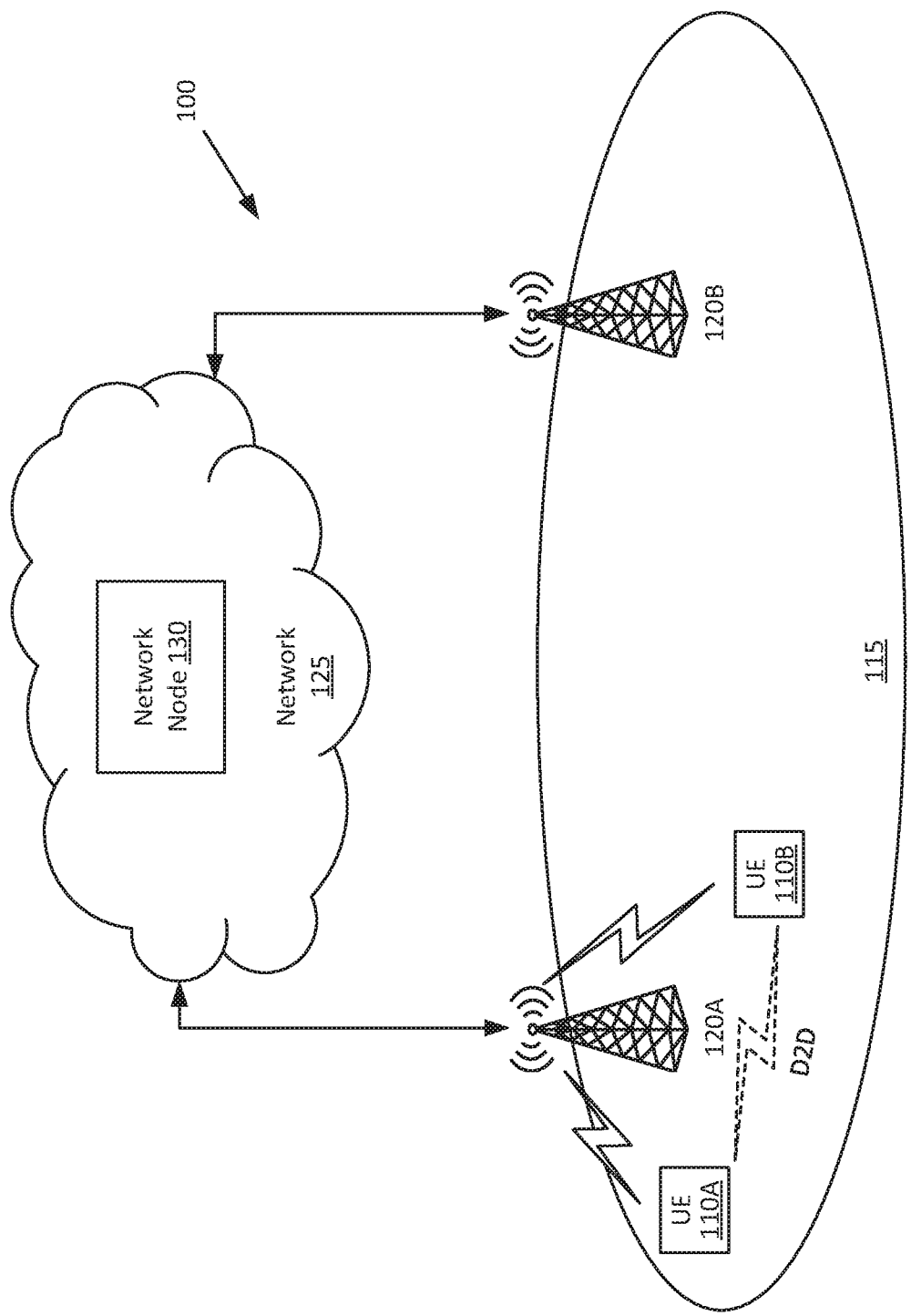
FIG. 1 illustrates an example wireless network.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. Mobility Management Entity (MME), a Packet Data Network (PDN) Gateway (P-GW), a Service Capability Exposure Function (SCEF), etc.), O&M, OSS, Self-organizing Network (SON), positioning node (e.g. E-SMLC), MDT, test equipment, etc.

Note that the description given herein describes a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell". However, particularly with respect to 5G/NR concepts, beams may be used instead of cells and, as such, it is important to note that the concepts described herein are equally applicable to both cells and beams.

FIG. 1 illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes 130 over an internode interface.

For network security, operators can secure traffic inside and outside their network with IPsec and other protocols. For example, IPsec is used to protect the S1 and X2 control planes as specified by 3GPP TS 33.210 and TS 33.401.

In some embodiments, radio access node 120 can be a "distributed" radio access node in the sense that the radio access node 120 components, and their associated functions, can be separated into two main units (or sub-radio network nodes) which can be referred to as the central unit (CU) and the distributed unit (DU). Different distributed radio network node architectures are possible. For instance, in some architectures, a DU can be connected to a CU via dedicated wired or wireless link (e.g., an optical fiber cable) while in other architectures, a DU can be connected a CU via a transport network. Also, how the various functions of the radio access node 120 are separated between the CU(s) and DU(s) may vary depending on the chosen architecture.

Figure 2:
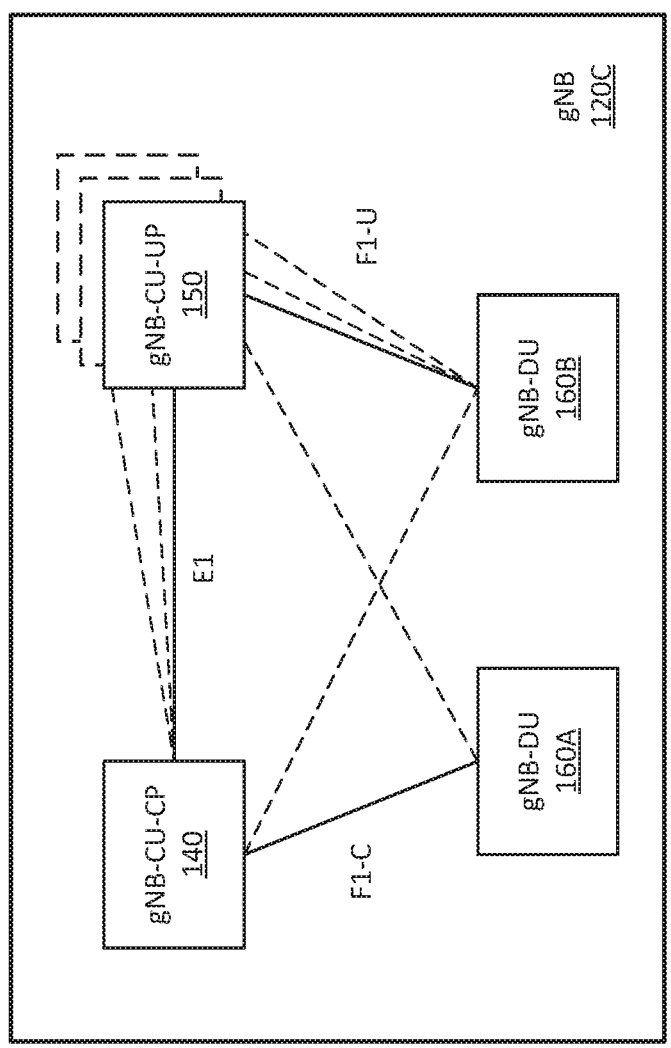
FIG. 2 illustrates an example distributed radio access node.

FIG. 2 illustrates an example distributed radio access node (gNB) 120C. As described in 3GPP TS 38.401, gNB 120C may consist of a gNB-CU-CP 140, multiple gNB-CU-UPs 150 and multiple gNB-DUs 160A-160B. The gNB-CU-CP 140 is connected to the gNB-DU 160 through the F1-C interface. The gNB-CU-UP 150 is connected to the gNB-DU 160 through the F1-U interface. The gNB-CU-UP 150 is connected to the gNB-CU-CP 140 through the E1 interface. In this example, one gNB-DU 160 is connected to only one gNB-CU-CP 140, and one gNB-CU-UP 150 is connected to only one gNB-CU-CP 140. Note that for resiliency, a gNB-DU 160 and/or a gNB-CU-UP 150 can be connected to multiple gNB-CU-CPs 140 by appropriate implementation. In this example, one gNB-DU 160 can be connected to multiple gNB-CU-UPs 150 under the control of the same gNB-CU-CP 140, and one gNB-CU-UP 150 can be connected to multiple gNB-DUs 160 under the control of the same gNB-CU-CP 140. Note that the connectivity between a gNB-CU-UP 150 and a gNB-DU 160 can be established by the gNB-CU-CP 140 using Bearer Context Management functions.

The example of FIG. 2 considers a flexible scheme to place the various entities constituting the RAN access network and enable collaboration between them. The functions requiring tight synchronization in the protocol stack and stringent latency are closer to the radio environment (e.g. closer to the end-user). These can be referred to as the Baseband Processing Functions (BPF) and correspond to the 3GPP gNB-DUs 160, implementing the PHY/MAC/RLC stack layers (see 3GPP TS 38.401). The functions with radio asynchronous functions (e.g. Packet Processing Function (PPF) and Radio Control Function (RCF)) correspond to the 3GPP gNB-CU-UP 150 and gNB-CU-CP 140, respectively, can be virtualized and implement the PDCP/IP and PDCP/RRC stack layers.

In FIG. 2, there is optionally a pool of gNB-DUs 106A-106B that can connect to a pool of gNB-CUs (gNB-CU-UPs 150 and gNB-CU-CPs 140) over an IP network. At initiation, a persistent connection is established between gNB-DUs and gNB-CUs. The different UE data flows can be mapped to data radio bearers (DRBs) within these persistent connections.

Virtual RAN (vRAN) is developed as a package of Virtual Network Functions (VNFs) to be delivered and deployed in a multi-tenant environment. More precisely, the vRAN Central Units (the gNB-CUs functions, i.e., gNB-CU-UPs and gNB-CU-CPs) can be implemented as virtual machines and/or containers.

In some scenarios, a containerized vRAN can be deployed over third party clouds which cannot be assumed to be trustworthy. This represents a new deployment model: the physical infrastructure is owned by a public cloud provider or an operator, which may opt to deploy other third party VNFs, collocated with the vRAN package. Therefore, the trust model in traditional RAN (i.e. where the entire RAN infrastructure is provided to an operator) is now revisited. Not only the whole set of RAN assets (e.g., UE security contexts in RAN) requires protection from illegitimate and unauthorized access by the infrastructure owner or other tenants, but also IPR and reputation are to be maintained. From the vRAN development perspective, this can result in putting a minimal amount of trust in the cloud physical environment while providing a maximum-security protection at the VNF level. Thus, attempts of IPsec network traffic analysis from the cloud provider or from the other tenants in order to gain various insights (e.g., chart the vRAN topology, infer sensitive data from persistent IPsec tunnels) should be addressed.

Figure 3:
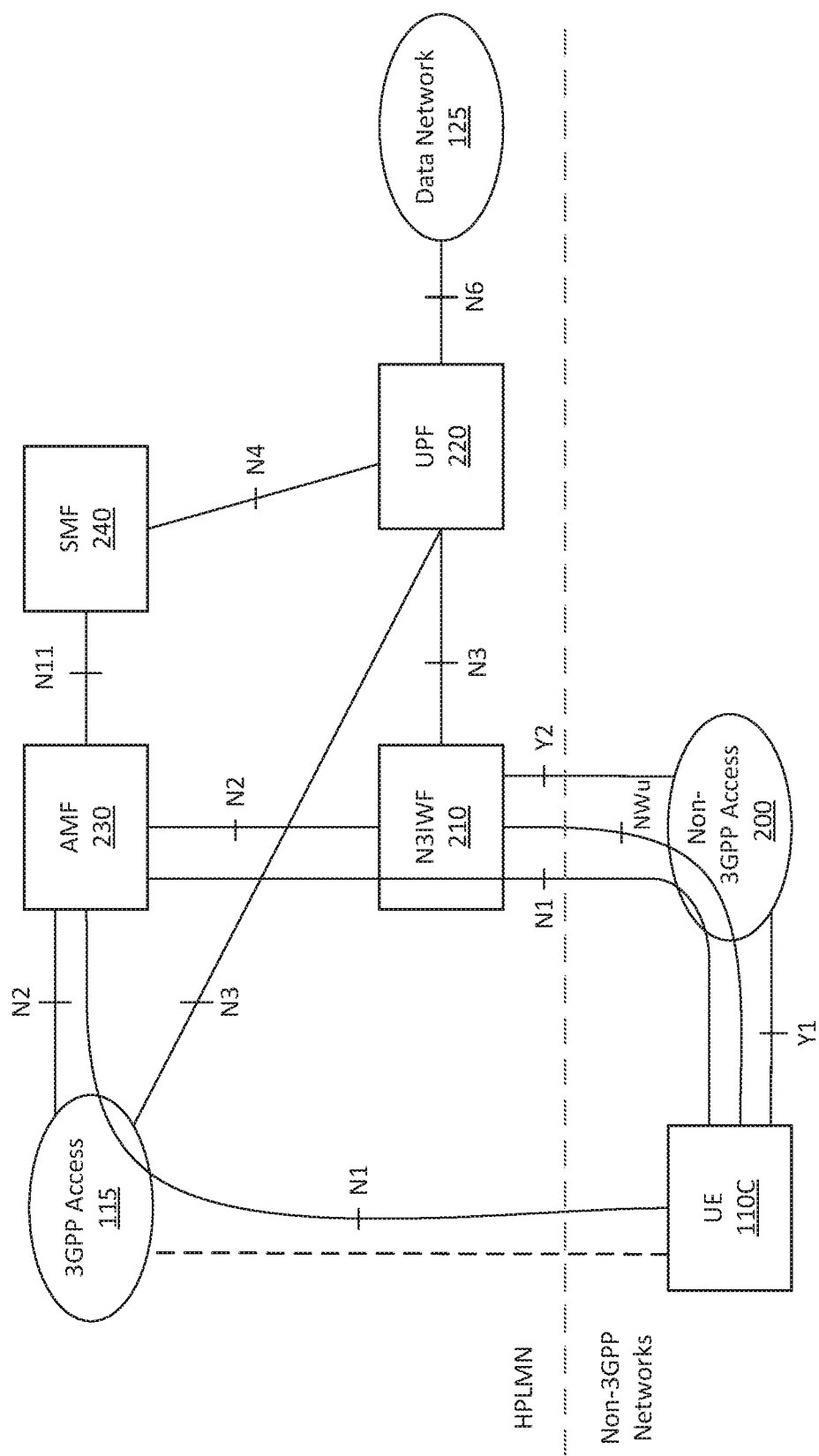
FIG. 3 illustrates an example network with non-3GPP access.

FIG. 3 illustrates an example of non-3GPP access. The 5G/NR system specifies an option for a UE 110C to attach to the network via a non-3GPP access 200, supporting the connectivity via WLAN access, for example. In this scenario, UE 110C can establish an IPsec tunnel with the Non-3GPP InterWorking Function (N3IWF) 210 in order to register with the 5G Core Network over non-3GPP access 200. The N3IWF 210 terminates the IKEv2/IPsec protocols with the UE 110C over the NWu interface and relays over N2 the information needed to authenticate the UE 110C and authorize its access to the 5G Core Network.

The 5G core network aims at separating user plane and control plane. The user plane carries user traffic while the control plane carries signaling in the network. In FIG. 3, the User Plane Function (UPF) 220 is in the user plane and all other network functions, i.e., the Access and Mobility Function (AMF) 230 and Session Management Function (SMF) 240, are in the control plane. Separating the user and control planes can allow each plane resource to be scaled independently.

The AMF 230 provides UE-based authentication, authorization, mobility management, etc. A UE 110C even using multiple access technologies is basically connected to a single AMF 230 because the AMF is independent of the access technologies. The SMF 240 is responsible for session management and allocates Internet Protocol (IP) addresses to UEs 110C. It also selects and controls the UPF 220 for data transfer. If a UE 110C has multiple sessions, different SMFs 240 may be allocated to each session to manage them individually and possibly provide different functionalities per session.

Reference point representations of the 5G network architecture are used to develop detailed call flows in the normative standardization. The N1 reference point is defined to carry signaling between the UE 110C and AMF 230. The reference points for connecting between the access network 115 and AMF 230 and between the access network 115 and UPF 220 are defined as N2 and N3, respectively. There is a reference point, N11, between the AMF 230 and SMF 240, which implies that the SMF 240 is at least partly controlled by the AMF 230. N4 is used by the SMF 240 and UPF 220 so that the UPF 220 can be set using the control signal generated by the SMF 240, and the UPF 220 can report its state to the SMF 240.

Y1 is the reference point between the UE 110C and the untrusted non-3GPP access (e.g. WLAN) 200. This depends on the non-3GPP access technology and is outside the scope of 3GPP. Y2 is the reference point between the untrusted non-3GPP access 200 and the N3IWF 210 for the transport of NWu traffic. NWu is the reference point between the UE 110C and N3IWF 210 for establishing secure tunnel(s) between the UE 110C and N3IWF 210 so that control-plane and user-plane exchanged between the UE 110C and the 5G Core Network is transferred securely over untrusted non-3GPP access 200.

3GPP has specified security requirements for the protection of the 5G newly introduced interfaces—F1 and E1 in the radio access network, N2 and N3 between the gNB and the 5G core network). IPsec is to be supported by gNB as follows:

F1: (TS 33.501 9.8.2) "IPsec is mandatory to implement on the gNB-DU and on the gNB-CU."

E1: (TS 33.501 9.8.3) "IPsec is mandatory to support on the gNB-CU-UP and the gNB-CU-CP."

N2: (TS 33.501 9.2) "In order to protect the N2 reference point, it is required to implement IPsec ESP and IKEv2".

N3: (TS 33.501 9.3) "IPsec is mandatory to implement on the gNB. On the core network side, a SEG may be used to terminate the IPsec tunnel."

Xn (between gNBs): (TS 33.501 9.4) "In order to protect the traffic on the Xn reference point, it is required to implement IPsec".

UE privacy enforcement is a concern as IP network traffic analysis from malicious UEs in the untrusted non-3GPP access network, or from the non-3GPP access provider, in order to gain various insights into UE data should be considered.

Legacy IPsec deployed in the above-described use-cases may not always offer the right security properties under the new threat model articulated on virtual environments. Therefore, in addition to malicious end-users, the threat model for virtualized environments can include two new types of threat agents: (1) tenants collocated in the same physical infrastructure; and (2) the cloud provider itself, which may be different from the operator (e.g., a public cloud provider).

In the containerized vRAN deployed over untrusted clouds, the vRAN VNFs are intended as "long-life" VNFs. The IPsec tunnels protecting the inter-VNF communication (i.e., F1, E1, N2, N3 interfaces) are not set-up/torn-down frequently. Consequently, the IPsec SPIs are also "long-life".

There may be a risk of having a 3rd party (another tenant collocated on the same physical infrastructure or the public cloud provider) attempting vRAN network traffic eavesdropping. An attacker could map the IPsec tunnel SPI values to specific interfaces and vRAN VNFs in order to, for example: (1) reveal the vRAN topology (organization of VNFs in vRAN) and gain insights into the vRAN package itself; (2) map SPIs to data plane traffic; etc.

As described, in 5G non-3GPP Access, the IPsec tunnel is established between the UE and N3IWF. A variant of an eavesdropping attack to break the UE location privacy could turn out successful, as an attacker in the vicinity of a victim UE can map SPI values to UEs, thus compromising UE privacy and locating the UE.

In the case of health scenario (eHealth), or other industrial use-cases, network slices are usually required spanning (v)RAN and the core network. If dedicated IPsec tunnels are setup per slice to protect the (v)RAN (VNF) traffic, network slices may be identified by the IPsec SPIs. Such traffic profiling based on SPI is expected to be the first step performed by the attacker (e.g. another tenant, public cloud provider) when targeting a specific slice.

IPsec, as defined according to IETF Request For Comments (RFC) 4301 "Security Architecture for the Internet Protocol" [https://tools.ietf.org/html/rfc4301], has defined two protocols for formatting a packet: Encapsulating Security Payload (ESP) [IETF RFC 4303] and Authentication Header (AH) [IETF RFC 4302]. Conventionally, the ESP format is widely used. Some embodiments herein will be described with respect to ESP but can be extended to AH as well.

Figure 4:
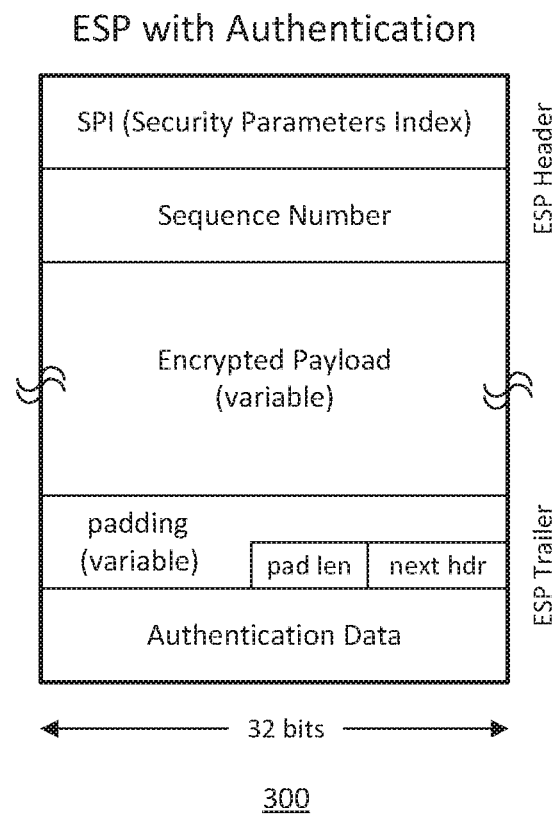
FIG. 4 illustrates an example ESP IPsec packet.

FIG. 4 illustrates an example ESP IPsec protected packet 140. An IPsec packet can be identified by its source IP address, destination IP address and the SPI value. The other remaining parameters are encrypted and cannot be used to identify a flow or other parameters of the original packet. IPsec does not provide any means to describe or tag the encapsulated traffic, which is represented as the Encrypted Payload in FIG. 4. As a result, the conventional IPsec protocol does not enable protection of N distinct flows in a single IPsec channel while indicating the flow to which the packet belongs to any in-path network elements. Nonetheless, such an indication may be useful for deploying load balancers or other in-path middlebox functions.

IPsec can operate in transport mode or tunnel mode. In transport mode, even though it is possible to encrypt some options in the header, the main purpose is to encrypt only the payload of an IP packet. The routing of the packet is therefore not affected as the IP header is not encrypted. In tunnel mode, the entire IP packet is encrypted and encapsulated into a new IP packet with a new IP header. Tunnel mode can be used to establish virtual private networks for communication between endpoints.

FIG. 5 illustrates an example secure network architecture. Network nodes 310 and 340 are the security (e.g. IPsec) endpoints while network nodes 320 and 330 are middlebox functions. In some embodiments, endpoint node 310 can perform an encryption function and endpoint node 340 can perform a decryption function. Accordingly, data is protected as it traverses the example network segment from node 310 to node 320 to node 330 to node 340.

Figure 5A:
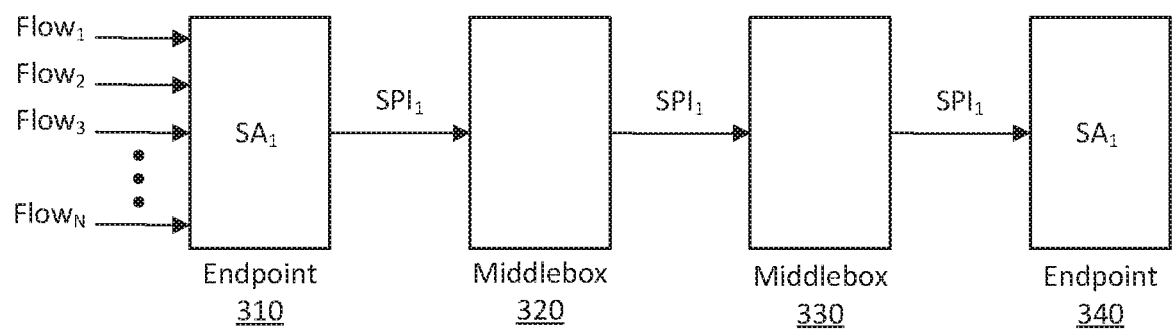
FIG. 5 illustrates an example secure network architecture.

In FIG. 5a, N number of distinct data flows are encapsulated in a single SA (e.g. $SA_1$) having a single associated SPI (e.g. $SPI_1$). Accordingly, with only one SPI being common to all N flows, the in-path elements (e.g. nodes 320, 330) are unable to distinguish between the N different flows. In other words, the middleboxes 320, 330 are considered flow-agnostic in this example.

Figure 5B:
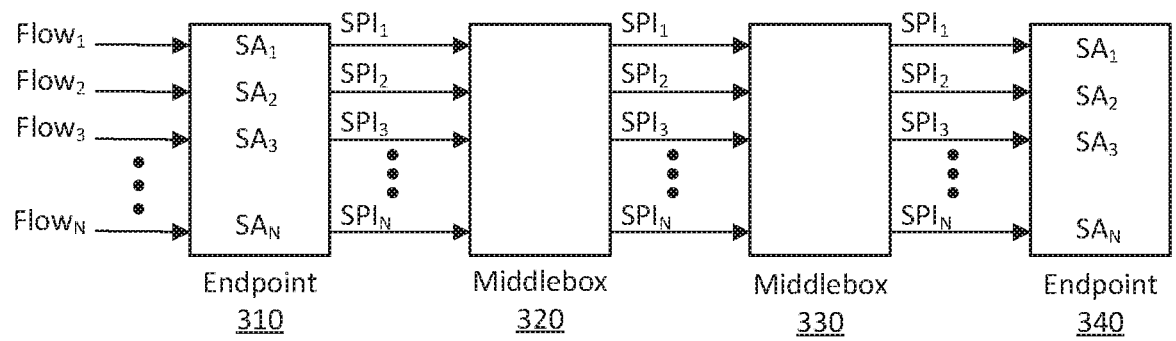

In FIG. 5b, each of the N flows requires its own unique SA (e.g. $SA_1$-$SA_N$) and associated SPI (e.g. $SPI_1$-$SPI_N$). Thus, each flow can be identified by its SPI value, for example by middleboxes 320, 330. In this case, the security endpoints 310 and 340 must manage N number of security contexts, each of them potentially involving multiple keys (upstream, down streams, Internet Key Exchange (IKE) keys, authentication keys, etc.). A large number of flows may require significant signaling to configure the IPsec tunnels. Every tunnel and corresponding SA (e.g. one SA per flow) will be individually negotiated via IKEv2 which may also require separate cryptographic material (e.g. secret keys). As a result, two sets of cryptographic materials as well as session contexts will be computed between the endpoints 310 and 340 for each of the N flows.

In conventional IPsec packet processing, an outgoing IP packet is matched against the Security Policy Database (SPD). Traffic Selectors (TS), such as IP addresses, ports, etc., can be taken from the outgoing packet and matched against the SPD. The resulting action is one of bypass, protect or discard.

If a match occurs with a security policy, the security policy can provide a reference to a SA that contains the security material necessary to protect (e.g. encrypt) the packet, the TS parameters, and the SPI. Although the TSs may be included in the SA, they are not considered for outbound traffic. It is noted that the SPI is not typically used as a reference for the SA for processing outbound traffic, but instead an object or memory pointer can be used. The SPI is the identifier between the two IPsec endpoints, while other identifiers can be used internally in each system.

The security policy described in the SA can then be applied and the protected packet is transmitted.

In conventional IPsec processing, for incoming packets, the receiving node uses the SPI of the packet to identify the corresponding SA which contains the cryptographic material to decrypt the packet. Prior to processing a decrypted packet (e.g. forwarding the packet to the upper layers), the IPsec stack can check the TS parameters contained in the SA against the TS parameters of the decrypted packet.

Some embodiments will describe an IPsec privacy hardening approach to prevent reconnaissance (e.g. passive attacks) on communications within networks. Some embodiments will be described with respect to the 5G/vRAN network(s) where communications can be a subject of a passive monitoring. Those skilled in the art will appreciate that the embodiments described herein are equally applicable to any type of communication network.

Some embodiments include:
A new IPsec SA structure
A new initialization procedure for IPsec SA.
A new data plane approach to update SPI values in IPsec SA avoiding the use of the control plane. The association agreement can be pre-agreed between peers in the data plane.
A new procedure to synchronize IPsec SA parameters between peers.
A new procedure to enable SPI values within IPsec SA. This procedure allows nodes to: change SPI values associated to their outbound traffic, and/or update SPI values in the incoming IPsec SA traffic.
A new procedure to lookup SAs between peers in the SA Database (SADB).

New SA Structure

Some embodiments include modifying the conventional structure of the SA with:
an agreement of a new key between two nodes: SPI-KEY
an agreement algorithm to generate a future SPI: SPI-ALG
a field that contains the next expected SPI: NEXT-SPI
a field that contains the previous SPI: PREVIOUS-SPI

SPI-KEY

The SPI-KEY is agreed upon between the two nodes establishing an IPsec SA. The SPI-KEY can be agreed during IKEv2 exchange, and each inbound/outbound SA can have a dedicated SPI-KEY.

SPI-ALG:

The SPI-ALG is an algorithm and method agreed upon between the two peers to generate the SPI value(s). In some embodiments, the SPI-ALG can evolve/change over time. An example of such an algorithm could be based on a hashing function such as sha256 that would derive the NEXT-SPI as follows:
NEXT-SPI=sha256(1+SPI-KEY), for first RENEW-SPI call NEXT-SPI=sha256(1+CURRENT-SPI), for any other consequent RENEW-SPI call

NEXT-SPI:

The NEXT-SPI field(s) in the SA contains the (expected) value of the SPI when the other peer has performed a SPI value renewal operation. The value in the NEXT-SPI field has never been observed on the network to that point in time. Once the NEXT-SPI is observed on the network, its value can be moved to the CURRENT-SPI.

CURRENT-SPI:

The CURRENT-SPI field in the SA corresponds to the SPI field of the SA. It contains the value of the latest value observed of the SPI. Once the NEXT-SPI value is observed in the network, the CURRENT-SPI value can be moved to the PREVIOUS-SPI.

PREVIOUS-SPI:

The PREVIOUS-SPI field(s) in the SA corresponds to the SPI value(s) that may be encountered by, for example, delayed packets. An SPI value of an incoming packet matching a PREVIOUS-SPI value can be expected to happen for a short time following the NEXT-SPI being moved to CURRENT-SPI. This PREVIOUS-SPI field is optional as some implementations may prefer to enforce a "hard" SPI renewal versus a "soft" SPI renewal. The hard SPI renewal may result in some packets being rejected when the SPI renewal occurs, while the soft SPI renewal would not.

New SPI Initialization

With the conventional IPsec implementation, only the CURRENT-SPI is initialized in the SA. An example modified initialization procedure is as follows:
generate NEXT-SPI
put the NEXT-SPI value in the NEXT-SPI field
copy the value of the CURRENT-SPI field to the PREVIOUS-SPI field SPI Renewal on Outbound Traffic When a host decides to renew the currently used SPI, the RENEW_SPI can operate as follows:
copy the value of the CURRENT-SPI field to the PREVIOUS-SPI field
copy the value of the NEXT-SPI field to the CURRENT-SPI field
generate NEXT-SPI
put the NEXT-SPI value in the NEXT-SPI field The decision to renew the SPI may not be subject to any agreement between the two nodes. More specifically, this is intended to avoid having a specific agreement (e.g. using IKEv2) that could potentially leak some information about the SPI renewal procedure.

In some embodiments, each peer may have its own logic. It can send the new packets with the new value of SPI. For outbound traffic, there is no need to keep track of the previous SPI value. SA are typically unidirectional, so for outbound traffic, the SA does not need to keep track of these previous values.

Some implementations for outbound SA may simply consider not storing any value for the NEXT-SPI and instead generate it on demand as required. In this case, the NEXT-SPI field would not be stored in the SA.

It is noted that sending an IPsec packet including the NEXT-SPI value is how the node will signal the other peer node that the SPI has been renewed and must be renewed at the other peer. SIGNAL_OUTBOUND_SPI_RENEWAL is the procedure to signal the renewal of the SPI. An example of the procedure is as follows:
RENEW_SPI(outbound SA)
process regular IPsec on the outbound packet Note that it may be preferred that the renewal decision is made at transmission of an outbound packet to ease keeping track of the signaling. If the renewal/update is performed without sending a packet(s) including the new SPI, it may cause de-synchronized states.

SPI Renewal on Inbound Traffic

A receiving peer node will update the inbound SA upon receiving an incoming IPsec packet that is issued by the SIGNAL_OUTBOUND_RENEWAL procedure. In this scenario, it is assumed that an incoming packet is: (1) a valid IPsec packet matching a SA and Security Policies; and (2) the SPI of the incoming packet matches the NEXT-SPI value in the SA. How to ensure validity of the packet will be described later. An example RENEW_SPI procedure is as follows:

copy the value of the CURRENT-SPI field to the PREVIOUS-SPI field
    copy the value of the NEXT-SPI field to the CURRENT-SPI field
    generate NEXT-SPI
    put the NEXT-SPI value in the NEXT-SPI field This operation is equivalent to the operation performed on the peer sending node (SIGNAL_RENEWAL). Accordingly, the SA is synchronized at both endpoints.

It is noted that this procedure can be applied for each packet. A peer sending a SIGNAL_RENEWAL should not proceed to SPI-RENEWAL procedure and send a new SIGNAL-RENEWAL before it receives an acknowledgement of SPI-RENEWAL procedure has been performed by the other node. In the case of unidirectional communications, this may be replaced by a sufficiently long timer. More explicitly, in case of unidirectional communication, the peer will not receive any acknowledgement. As a result, it will not receive explicit acknowledgment and peers may result in a desynchronized state. One alternative may be to assume that after a given number of packets have been sent, the other peer will have updated the SPI. Such a mechanism can prevent packet loss. When such mechanisms are used, back up mechanisms for resynchronization can also be considered. Another mechanism is to acknowledge the receipt with an empty or dummy packet.

Upon receiving the SIGNAL_RENEWAL, the peer receiving node will perform a SIGNAL_RENEWAL operation and send back an acknowledgement indicating that the operation has been appropriately performed.

One motivation for sending a SIGNAL_RENEWAL message is to ensure a stable state. If an observer sees a packet sent with NEXT-SPI (resp. CURRENT-SPI) being responded to with the CURRENT-SPI (resp. PREVIOUS-SPI), they may be able to correlate the change.

In general, the following rules should apply:
    Incoming packets with NEXT-SPI should be responded to with a NEXT-SPI.
    Incoming packets with a CURRENT-SPI should be responded to with a CURRENT-SPI.

As such, the binding between the packet and the SA is performed through the traffic selectors. There is no way IPsec can distinguish between a response issued from one or the other SA.

Some embodiments consider behaviors depending on a trade-off of requirements, namely security versus the quality of communication.

If a host does not want overlap between traffic with a NEXT-SPI and a CURRENT-SPI, the hosts can have the PREVIOUS-SPI field as VOID. This is essentially the same as not having a PREVIOUS-SPI field. The consequence is an incoming delayed packet will not be able to match a SPI value otherwise stored in the SPI-PREVIOUS field. When the protected packet is part of a TCP session, the TCP protocol may handle the replay, but the change may have some impacts on the carried traffic. When the packet is part of an UDP session, the packet is discarded and the detection is likely handled by the application upon a timer expiration or by the user. Typically, in the case of Web browsing for example, a DNS UDP request being discarded will not receive a response. The query will be re-sent upon a timer expires, or the end user will simply reload the web page. UDP traffic cannot be neglected, because IoT traffic uses UDP and, more generally, the web is moving from TCP to UDP with QUIC.

If a host accepts the overlap between traffic with a NEXT-SPI and a CURRENT-SPI, then the PREVIOUS-SPI value enables delayed packets to be accepted.

SPI Renewal Synchronization

Example procedure performed by a transmitting node is as follows:

```
Description of the state of the sending Node
variables representing the SPI related fields of the Outbound and
Inbound SA
Outbound SA (NEXT-SPI=a, CURRENT-SPI=b, PREVIOUS-SPI=c)
Inbound SA (NEXT-SPI=r, CURRENT-SPI=s, PREVIOUS-SPI=t)
state indicates whether a renewal-SPI can be performed or not.
Renewal can only be performed
when both nodes are expected to be synchronize. In this example
the synchronization state
is derived from observing inbound and outbound packets exchanged
between the two nodes
with the new SPI value. However, it is important to note that
there are still corner cases
possible when one node will be synchronized while the other will
not. This will be
detailed later.
State = synchronize
packet_counters that are observed input to derive if the node is
in a synchronized state
or not.
Outbound_packet_counter = 0
Inbound_packet_counter = 0
If decision to renew SPI == True and state == synchronize:
    RENEW_SPI( outbound SA )
    RENEW_SPI( inbound SA )
    State = unsynchronized
display SA
# Outbound SA (NEXT-SPI=d, CURRENT-SPI=a, PREVIOUS-SPI=b)
# Inbound SA (NEXT-SPI=u, CURRENT-SPI=r, PREVIOUS-SPI=s)
# State = unsynchronized
# Outbound_packet_counter = 0
Inbound_packet_counter = 0
For each outbound packet sent associated to the SA:
    If outbound packet is sent:
        SIGNAL_OUTBOUND_RENEWAL ## maybe not received by the
        other
end
    Outbound_packet_counter += 1 ## incrementing
  Else:
    No signal has been sent to the peer
    If state == unsynchronized and \
    ( outbound_packet_counter != 0 and inbound_packet_counter !=
0 ):
        State = synchronized
```

Example procedure performed by a receiving node is as follows (assuming inbound packet is a valid IPsec packet that has been appropriately decrypted and matches the Policy database):

```
If inbound packet SPI matches CURRENT-SPI:
    If state == synchronize:
        ## Normal Case
```

```
    Elif state == unsynchronized:
        ## this may be a response or both nodes have update at the
same time.
            ## in both cases the nodes are synch
    State = synchronize
            Outbound_packet_counter = 0
            Inbound_packet_counter = 0
    Proceed IPsec as usual
Elif inbound packet SPI matches PREVIOUS-SPI:
    ## may result from a delayed packet, the other node is not
synchronized
    ## They might be more complex way to handle this but a simple
way to do is:
    If state == synchronized:
        ## this is expected to be a delayed packet
        ## possibly delayed packet may be counted, and state may be
updated accordingly to
        ## unsynchronized. What is important is that the receiving
node does not perform any SPI
        ## renewal operation until it has not received the
confirmation both nodes are synch.
            ## This situation indicates clearly nodes were not synch at
the time the packet has been
            ## sent. Some implementation may also consider PREVIOUS-SPI
as non-matching after some
            ## time. The easiest way to implement such policies may also
to remove the PREVIOUS-SPI
            ## from the list of SPI, the spi of the incoming packet is
matched with.
    Elif state == unsynchronized:
        ## this likely indicate the other peer is not yet sync yet.
            ## In any case...
    Proceed IPsec as usual
Elif inbound packet SPI matches NEXT-SPI:
    If state == synchronize: ## signals a SPI renewal has been
operated by the sending node.
            RENEW_SPI( inbound SA )
    Elif state == unsynchronized:
        ## this likely indicates the peer has not acknowledge the
previous update and has
            ## performed a SPI-RENWAL. The node renew the SPI and
should acknowledge.
            RENEW_SPI( inbound SA )
            State = synchronize
            Outbound_packet_counter = 0
            Inbound_packet_counter = 0
```

Some embodiments will further consider corner case examples where two peers are updating their SPI and one peer does not receive any packet from the other peer, while the other does receive a packet. For example:

Peer A sends packets to Peer B
Peer B sends packet to Peer A
Peer A receives packets from Peer B
Peer B does not receive packets from Peer A At the time of the renewal, both nodes Peer A and Peer B are in an unsynchronized state. Peer A moves into a synchronize state, while Peer B remains in an unsynchronized state.

As Peer A is in synchronized state, it may re-do the SPI renewal procedure. However, packets received from Peer B will keep the PREVIOUS-SPI value. Peer A will remain in an unsynchronized state.

When Peer B starts receiving the traffic, a matching will occur with NEXT-SPI and Peer B will catch up to the CURRENT-SPI value of Peer A.

SADB Lookup Procedure

Inbound traffic is not under the control of the receiving host. As such the receiving host needs to be able to detect when the transmitting host has decided to renew the SPI. The conventional SA matching rule is: "if an incoming SPI does not match that SPI of a SA in the SADB, discard the incoming packet".

According to some embodiments herein, an example SA matching rule is "if the incoming SPI does not match one of the CURRENT-SPI, NEXT-SPI PREVIOUS-SPI of a SA in the SADB, discard incoming packet".

There are a variety of ways to implement the aforementioned rule. Since the renewal operation is expected to happen regularly, checking different SPI values upon receiving a packet can increase the space complexity of SPIs list by three times (current, next, and previous SPI values), thus increasing the time lookup. Alternatively, separate lists can be considered to keep track of CURRENT-SPI, PREVIOUS-SPI and NEXT-SPI. In this embodiment, the lookup on the second list will only happen when a mismatch occurs. The time lookup time for a non-renewed SPI will remain the same.

Accordingly, an example implementation is as follows:
if the incoming SPI does not match CURRENT-SPI of SA
    in the SADB:
    if the incoming SPI does not match PREVIOUS-SPI of
        SA in the SADB:
        if the incoming SPI does not match NEXT-SPI of SA
            in the SADB:
            discard incoming packet Unchanged IP SEC Validation Procedure When SA information is changed, the implementation must ensure that a legitimate peer performs the update of the SPI value. More specifically, an attacker sending random packets should not be able to trigger an update of SPI value, which will result in a desynchronized state.

When the SPI value of an incoming packet matches the NEXT-SPI value, the packet should be decrypted, then checked within the SADB prior to the SPI value(s) being updated. This procedure complies with the conventional IPsec implementation having packet counters that are incremented only if packets are considered to be valid.

Some embodiments described herein provide benefits for both the Containerized vRAN deployment in untrusted cloud as well as for 5G non-3GPP access, in order to enforce privacy of IPsec tunnel endpoint entities. In addition, the solution does not impact legacy functionality implemented by IPsec endpoints, e.g., the vRAN VNFs.

The embodiments described herein do not interrupt nor affect any ongoing communications protected by IPsec during SPI renewal procedure. No additional signaling is added to the control plane for the renewal of IPsec SPIs.

The embodiments described herein do not prevent encoding meaningful information in the IPsec SPI field, which can be useful for enforcing access control policies. Further, the renewal procedure does not leak any information, such as a negotiation involving the control plane (e.g. IKEv2), that would indicate a change occurs. In contrast, a change of SPI can be handled entirely by the data plane, which makes it difficult to detect.

In general, the embodiments described herein can be implemented by any IPsec deployment where privacy is a concern.

Figure 6:
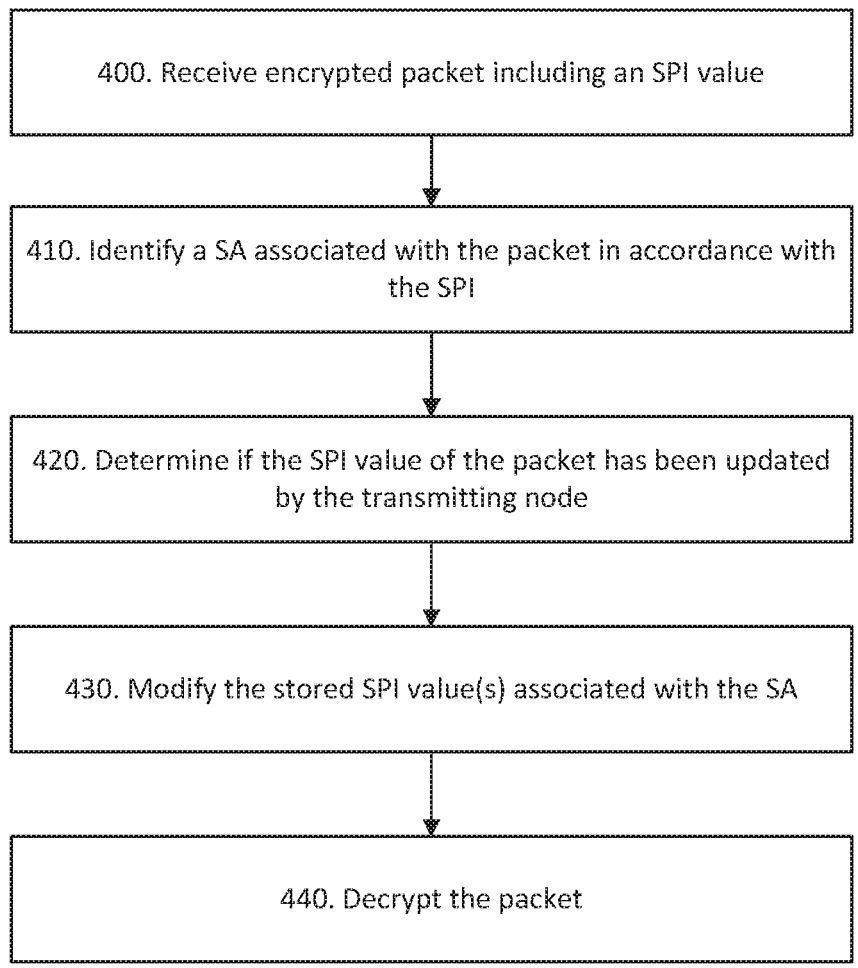
FIG. 6 is a flow chart illustrating a method for inbound packet processing.

FIG. 6 is a flow chart illustrating a method for inbound packet processing by a receiving node. The method of FIG. 6 can be implemented by a network node such as an IPsec endpoint device.

Step 400: The node receives an encrypted packet including a SPI value. The encrypted packet can be received from a receiving node, such as a second network node or peer IPsec endpoint. The SPI value can be passed as a parameter or read from the packet.

Step 410: Identify a SA associated with the encrypted packet in accordance with the SPI value of the packet. In some embodiments, this can include determining that the SPI value of the packet corresponds to one of a plurality of stored SPI values associated with the SA. In some embodiments, the SA can include one or more of a current SPI field, a next SPI field, and/or a previous SPI field.

Using the SPI value of the received packet, a lookup operation can be performed to determine if the packet SPI matches any of the stored SPI values of a SA. In some embodiments, this can include performing a first lookup to determine if the incoming SPI matches a current SPI field of the SA. If no, a second lookup can be performed to determine if the incoming SPI matches a previous SPI field of the SA. If no, a third lookup can be performed to determine if the incoming SPI matches a next SPI field of the SA. In some embodiments, the order of the lookup operations can be altered. In some embodiments, a single lookup operation can be performed on all of the stored SPI fields/values of the SA.

In the case that the incoming packet does not match any of the plurality of SPI values associated with any stored SA(s), the packet can be discarded.

Step 420: Determine if the SPI value of the packet has been updated by the transmitting node. In some embodiments, responsive to determining that the incoming SPI matches a next SPI field in the SA, it is determined that the transmitting node has updated/changed/modified the SPI value associated with the SA.

Step 430: Modify one or more of the stored SPI value(s) associated with the SA. Responsive to determining that the transmitting node has updated the SPI value, the receiving node can also update the SPI value(s) stored in the SA.

In some embodiments, updating the SPI value(s) of the SA can include one or more of the following steps. The receiving node can copy the value in the next SPI field to the current SPI field of the SA. The receiving node can generate a new next SPI value. The next SPI value can be generated using an SPI algorithm and can be stored in the next SPI field of the SA. The receiving node can copy the value in the current SPI field to a previous SPI field of the SA. In some embodiments, multiple previous SPI fields can be stored in the SA.

Step 440: Decrypt the packet. The receiving node can decrypt the received packet using a security key from the identified SA.

In some optional embodiments, the decrypted packet can then be verified by checking that the clear text packet parameters (e.g. traffic selectors) correspond to the security policy. After verifying the packet, the decrypted packet can be processed accordingly. In some embodiments, this can include passing the decrypted packet to the next/upper layer(s). For example, if the decrypted packet is a TCP packet, it can be sent to the TCP stack for processing. In another example, if a tunnel mode is used, the decrypted packet will be an IP packet and can be processed accordingly. In some embodiments, processing the decrypted packet can include forwarding the decrypted packet towards, or transmitting the decrypted packet to, its intended destination.

It will be appreciated that one or more of the above steps can be performed simultaneously and/or in a different order. Some steps may be optional and can be omitted in some embodiments.

Figure 7:
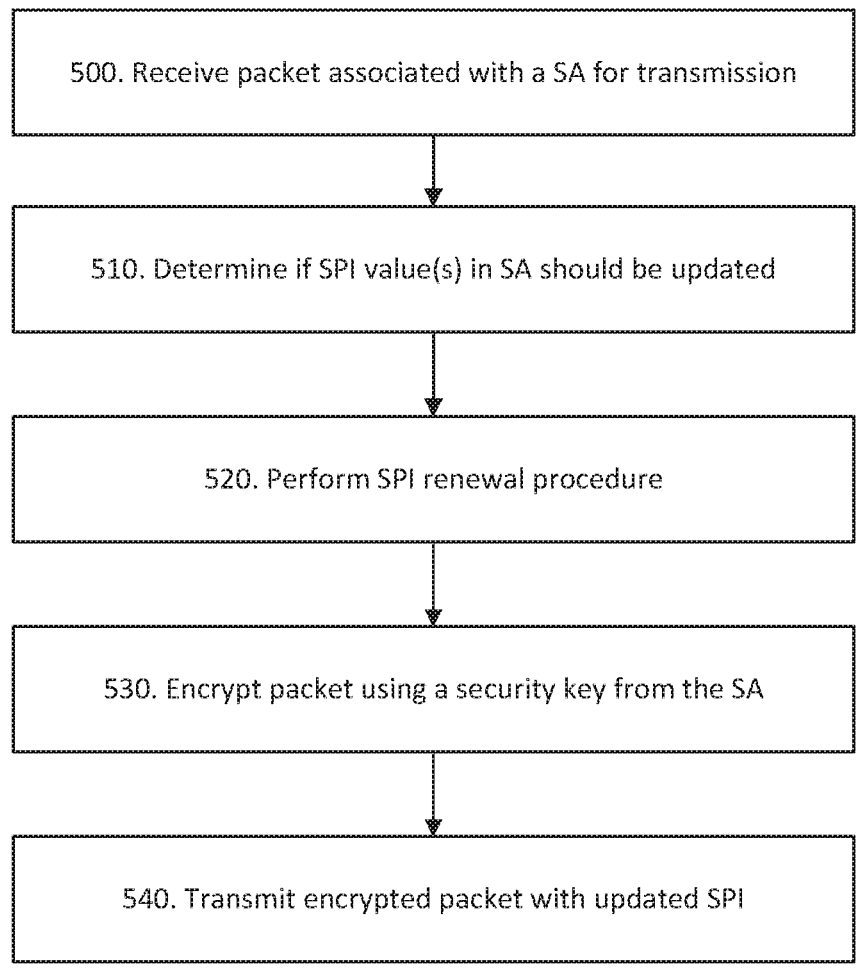
FIG. 7 is a flow chart illustrating a method for outbound packet processing.

FIG. 7 is a flow chart illustrating a method for outbound packet processing by a transmitting node. The method of FIG. 7 can be implemented by a network node such as an IPsec endpoint device.

Step 500: The node receives a packet associated with a SA for transmission.

In some embodiments the packet can include one or more TS parameters. Traffic selectors can include, but are not limited to, 5-tuple values (source IP address, source port number, destination IP address, destination port number, protocol), local/remote address, next layer protocol, local/remote port (or ICMP message type/code or Mobility Header type, depending on the next layer protocol), etc. Further examples of traffic selectors are listed in IETF RFC 4301. The TS parameters can be extracted from the received packet and used to identify the SA that is associated with the packet. After identifying the SA, one or more SPI values associated with the packet can be determined. In some embodiments, the SA can include a current SPI value, a next SPI value and/or a previous SPI value.

Step 510: The node determines if the SPI value(s) stored in the SA should be updated.

Step 520: Responsive to determining to update the SPI value(s), the node performs a SPI renewal procedure to update the SPI value(s) of the SA.

In some embodiments, this can include copying the value of the current SPI field to the previous SPI field. The value of the next SPI field can be copied to the current SPI field. A new next SPI value can be generated and stored in the next SPI field.

Step 530: The node encrypts the packet using a security key from the SA. In some embodiments, this can include applying the security policy described in the associated SA and adding the updated SPI value to the encrypted packet.

Step 540: The node transmits the encrypted packet including the updated SPI value.

It will be appreciated that one or more of the above steps can be performed simultaneously and/or in a different order. Some steps may be optional and can be omitted in some embodiments.

Figure 8:
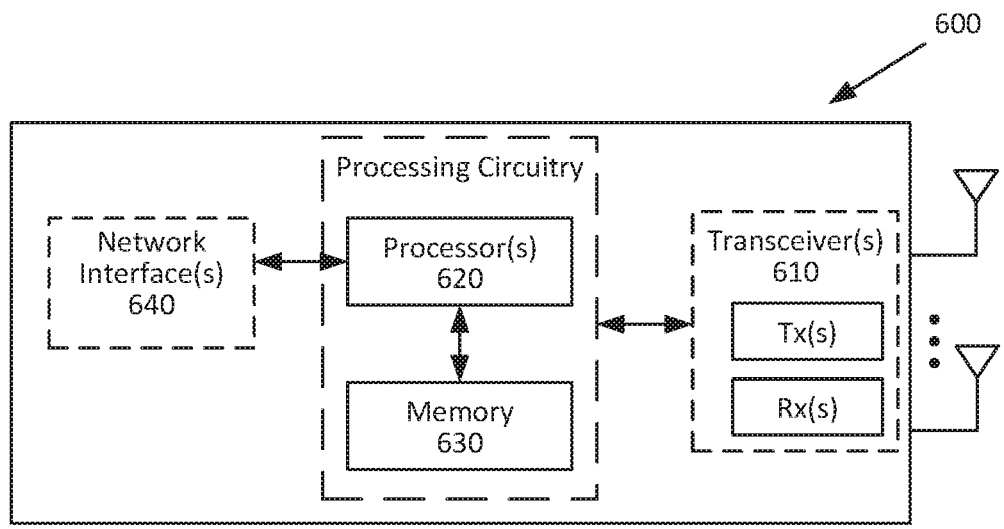
FIG. 8 is a block diagram of an example network node.

FIG. 8 is a block diagram of an exemplary network node 600, in accordance with certain embodiments. Network node 600 can be any of the IPsec endpoint devices as have been described herein, for example transmitting node 310 and/or receiving node 340 in FIG. 5. In some embodiments, network node 600 can be a UE, radio node or core network node as described in FIG. 1.

Network node 600 may include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by node 600, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of node 600, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for node 600, send output from node 600, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of network node 600 can include additional components beyond those shown in FIG. 8 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different access technologies, or may represent partly or entirely different physical components.

Processors, interfaces, and memory similar to those described with respect to FIG. 8 may be included in other network nodes (such as UE 110, core network node 130, etc.). Other network nodes may optionally include or not include a wireless interface (such as the transceiver described in FIG. 8).

Figure 9:
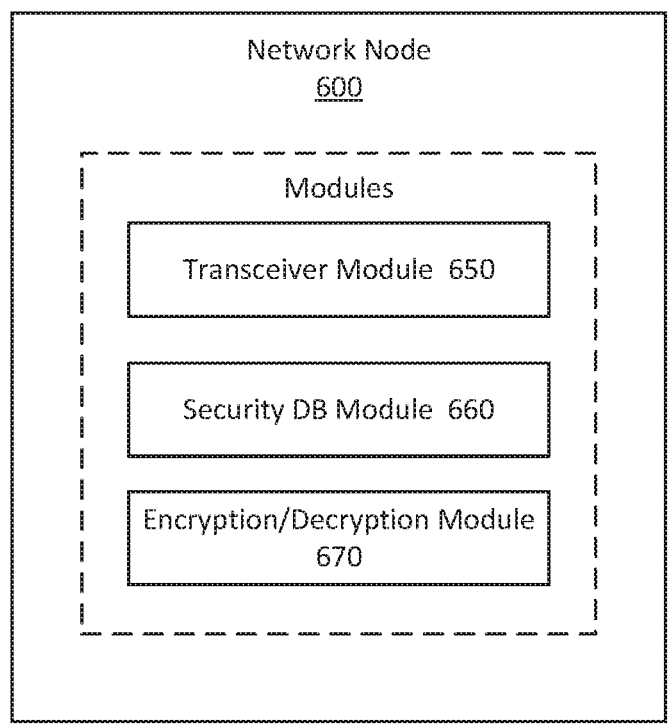
FIG. 9 is a block diagram of an example network node with modules.

In some embodiments, the network node 600, may comprise a series of modules configured to implement the functionalities of the network node described above. Referring to FIG. 9, in some embodiments, the network node 600 can comprise a transceiver module 650 for transmitting and receiving packets, a security database module 660 for managing security association(s) and security policies, and an encryption/decryption module 670 for processing encrypted packets.

It will be appreciated that the various modules may be implemented as combination of hardware and software, for instance, the processor, memory and transceiver(s) of network node 600 shown in FIG. 8. Some embodiments may also include additional modules to support additional and/or optional functionalities.

Figure 10:
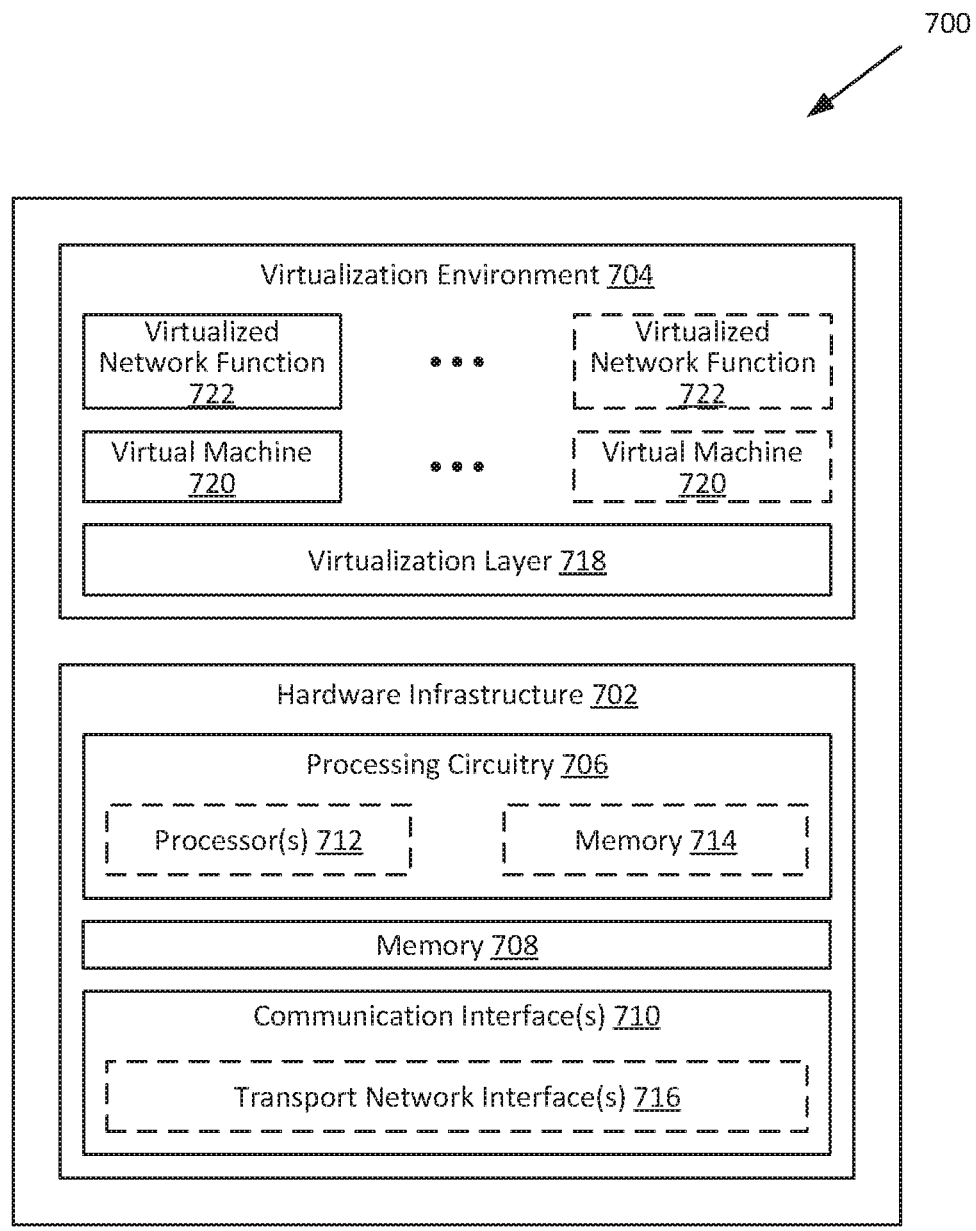
FIG. 10 is a block diagram of an example virtualized processing node.

Turning now to FIG. 10, some network nodes (e.g. UEs 110, radio access nodes 120, core network nodes 130, IPsec endpoints 310/340, etc.) in the communication network may be partially or even entirely virtualized. As a virtualized entity, some or all the functions of a given network node are implemented as one or more virtual network functions (VNFs) running in virtual machines (VMs) hosted on a typically generic processing node 700 (or server).

Processing node 700 generally comprises a hardware infrastructure 702 supporting a virtualization environment 704.

The hardware infrastructure 702 generally comprises processing circuitry 706, a memory 708, and communication interface(s) 710.

Processing circuitry 706 typically provides overall control of the hardware infrastructure 702 of the virtualized processing node 700. Hence, processing circuitry 706 is generally responsible for the various functions of the hardware infrastructure 702 either directly or indirectly via one or more other components of the processing node 700 (e.g. sending or receiving messages via the communication interface 710). The processing circuitry 706 is also responsible for enabling, supporting and managing the virtualization environment 704 in which the various VNFs are run. The processing circuitry 706 may include any suitable combination of hardware to enable the hardware infrastructure 702 of the virtualized processing node 700 to perform its functions.

In some embodiments, the processing circuitry 706 may comprise at least one processor 712 and at least one memory 714. Examples of processor 712 include, but are not limited to, a central processing unit (CPU), a graphical processing unit (GPU), and other forms of processing unit. Examples of memory 714 include, but are not limited to, Random Access Memory (RAM) and Read Only Memory (ROM). When processing circuitry 706 comprises memory 714, memory 714 is generally configured to store instructions or codes executable by processor 712, and possibly operational data. Processor 712 is then configured to execute the stored instructions and possibly create, transform, or otherwise manipulate data to enable the hardware infrastructure 702 of the virtualized processing node 700 to perform its functions.

Additionally, or alternatively, in some embodiments, the processing circuity 706 may comprise, or further comprise, one or more application-specific integrated circuits (ASICs), one or more complex programmable logic device (CPLDs), one or more field-programmable gate arrays (FPGAs), or other forms of application-specific and/or programmable circuitry. When the processing circuitry 706 comprises application-specific and/or programmable circuitry (e.g., ASICs, FPGAs), the hardware infrastructure 702 of the virtualized processing node 700 may perform its functions without the need for instructions or codes as the necessary instructions may already be hardwired or preprogrammed into processing circuitry 706. Understandably, processing circuitry 706 may comprise a combination of processor(s) 712, memory(ies) 714, and other application-specific and/or programmable circuitry.

The communication interface(s) 710 enable the virtualized processing node 700 to send messages to and receive messages from other network nodes (e.g., radio network nodes, other core network nodes, servers, etc.). In that sense, the communication interface 710 generally comprises the necessary hardware and software to process messages received from the processing circuitry 706 to be sent by the virtualized processing node 700 into a format appropriate for the underlying transport network and, conversely, to process messages received from other network nodes over the underlying transport network into a format appropriate for the processing circuitry 706. Hence, communication interface 710 may comprise appropriate hardware, such as transport network interface(s) 716 (e.g., port, modem, network interface card, etc.), and software, including protocol conversion and data processing capabilities, to communicate with other network nodes.

The virtualization environment 704 is enabled by instructions or codes stored on memory 708 and/or memory 714. The virtualization environment 704 generally comprises a virtualization layer 718 (also referred to as a hypervisor), at least one virtual machine 720, and at least one VNF 722. The functions of the processing node 700 may be implemented by one or more VNFs 722.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

What is claimed is:

1. A method performed by a receiving node, the method comprising:
    receiving an encrypted packet from a transmitting node, the packet including a Security Parameters Index (SPI) value;
    identifying a Security Association (SA) associated with the packet in accordance with determining that the SPI value of the packet corresponds to one of a plurality of stored different SPI values associated with the SA by determining if the SPI value of the packet matches a value stored in one of a previous SPI field, a current SPI field, and a next SPI field associated with the SA;
    responsive to determining that the SPI value of the packet has been updated by the transmitting node, modifying the plurality of stored different SPI values associated with the SA; and
    decrypting the packet using a security key from the identified SA.

2. The method of claim 1, wherein determining that the SPI value of the packet has been updated by the transmitting node comprises, determining that the SPI value of the packet matches a next SPI value associated with the SA.

3. The method of claim 1, wherein modifying the plurality of stored different SPI values associated with the SA comprises copying the stored next SPI value to a current SPI field.

4. The method of claim 1, wherein modifying the plurality of stored different SPI values associated with the SA comprises generating a next SPI value.

5. The method of claim 4, wherein modifying the plurality of stored different SPI values associated with the SA comprises, storing the generated next SPI value in a next SPI field.

6. The method of claim 4, wherein the next SPI value is generated using a SPI algorithm.

7. The method of claim 1, wherein modifying the plurality of stored different SPI values associated with the SA comprises, copying a stored current SPI value to a previous SPI field.

8. A receiving node comprising a communication interface and processing circuitry configured to:
    receive an encrypted packet from a transmitting node, the packet including a Security Parameters Index (SPI) value;
    identify a Security Association (SA) associated with the packet in accordance with determining that the SPI value of the packet corresponds to one of a plurality of stored different SPI values associated with the SA by determining if the SPI value of the packet matches a value stored in one of a previous SPI field, a current SPI field, and a next SPI field associated with the SA;
    responsive to determining that the SPI value of the packet has been updated by the transmitting node, modify the plurality of stored different SPI values associated with the SA; and
    decrypt the packet using a security key from the identified SA.

9. The receiving node of claim 8, wherein determining that the SPI value of the packet has been updated by the transmitting node comprises, determining that the SPI value of the packet matches a next SPI value associated with the SA.

10. The receiving node of claim 8, wherein modifying the plurality of stored different SPI values associated with the SA comprises copying the stored next SPI value to a current SPI field.

11. The receiving node of claim 8, wherein modifying the plurality of stored different SPI values associated with the SA comprises generating a next SPI value.

12. The receiving node of claim 11, wherein modifying the plurality of stored different SPI values associated with the SA comprises, storing the generated next SPI value in a next SPI field.

13. The receiving node of claim 11, wherein the next SPI value is generated using a SPI algorithm.

14. The receiving node of claim 8, wherein modifying the plurality of stored different SPI values associated with the SA comprises, copying a stored current SPI value to a previous SPI field.

* * * * *